(12) United States Patent
Sirpal et al.

(10) Patent No.: US 10,348,656 B2
(45) Date of Patent: Jul. 9, 2019

(54) METHODS AND DEVICES FOR DISPLAY DEVICE NOTIFICATIONS AND KEY HANDLING

(71) Applicants: Jamdeo Canada Ltd., Oakville (CA); Qingdao Hisense Electronics Co., Ltd., Qingdao, Shandong (CN); Hisense USA CORP., Suwanee, GA (US); Hisense International Co., Ltd., Qingdao, P.R.C. (CN)

(72) Inventors: Sanjiv Sirpal, Oakville (CA); Mohammed Selim, Oakville (CA); Alexander De Paz, Burlington (CA); Saulo Dourado, Oakville (CA); Tong Chen, Markham (CA); Gregory Burdzinski, Mississauga (CA)

(73) Assignees: Jamdeo Canada Ltd., Oakville (CA); Hisense USA Corp., Suwanee, GA (US); Qingdao Hisense Elecronics Co., Ltd., Qingdao (CN); Hisense International Co., Ltd., Qingdao (CN)

( * ) Notice: Subject to any disclaimer, the term of this patent is extended or adjusted under 35 U.S.C. 154(b) by 0 days.

(21) Appl. No.: 14/827,031

(22) Filed: Aug. 14, 2015

(65) Prior Publication Data
US 2016/0234563 A1    Aug. 11, 2016
US 2019/0149888 A9    May 16, 2019

Related U.S. Application Data

(60) Provisional application No. 62/145,361, filed on Apr. 9, 2015.

(51) Int. Cl.
*H04N 7/10* (2006.01)
*H04L 12/58* (2006.01)
(Continued)

(52) U.S. Cl.
CPC ............ *H04L 51/046* (2013.01); *G06F 3/017* (2013.01); *G06F 3/0481* (2013.01);
(Continued)

(58) Field of Classification Search
CPC .. H04N 21/488; H04N 21/482; H04N 21/426; H04N 21/458; H04N 21/81
See application file for complete search history.

(56) References Cited

U.S. PATENT DOCUMENTS 7,789,305 B2 *  9/2010  Howcroft ........... H04N 5/44591
                                                  235/386
2007/0039036 A1 *  2/2007  Sullivan ................. H04N 7/163
                                                  725/133
(Continued)

*Primary Examiner* — John R Schnurr
(74) *Attorney, Agent, or Firm* — Gordon & Rees LLP

(57) ABSTRACT

The present disclosure relates to methods and devices for presentation of display device notifications and key handling. The notifications are visually appealing, employing a common theme and user interface. The notifications are less-intrusive, such that the user experience is improved. The notifications can provide additional information, function as links to destinations, and give the user multiple options, from which the user can make a selection. Actions taken by a user can be controlled and monitored to optimize user interaction with the notifications. By providing display device notifications to a user, the user is able to process important information on a display device in an improved way.

21 Claims, 11 Drawing Sheets

(51) Int. Cl.
    *H04L 29/08*         (2006.01)
    *G06F 3/0482*       (2013.01)
    *G06F 3/0484*       (2013.01)
    *G06F 3/0485*       (2013.01)
    *H04L 12/24*         (2006.01)
    *G06F 3/0488*       (2013.01)
    *G06F 3/0481*       (2013.01)
    *G06F 3/01*           (2006.01)
    *G06F 3/14*           (2006.01)
    *G09G 5/00*          (2006.01)
    *H04N 21/426*       (2011.01)
    *H04N 21/458*       (2011.01)
    *H04N 21/482*       (2011.01)
    *H04N 21/488*       (2011.01)
    *H04N 21/81*         (2011.01)
    *H04N 21/4402*     (2011.01)
    *H04N 21/442*       (2011.01)
    *H04N 21/45*         (2011.01)
    *H04L 12/28*         (2006.01)

(52) U.S. Cl.
CPC .......... *G06F 3/0482* (2013.01); *G06F 3/0485* (2013.01); *G06F 3/04817* (2013.01); *G06F 3/04842* (2013.01); *G06F 3/04845* (2013.01); *G06F 3/04847* (2013.01); *G06F 3/04883* (2013.01); *G06F 3/1415* (2013.01); *G09G 5/005* (2013.01); *H04L 12/2807* (2013.01); *H04L 41/0806* (2013.01); *H04L 41/12* (2013.01); *H04L 41/22* (2013.01); *H04L 67/303* (2013.01); *H04L 67/306* (2013.01); *H04N 21/42653* (2013.01); *H04N 21/4402* (2013.01); *H04N 21/44227* (2013.01); *H04N 21/458* (2013.01); *H04N 21/4516* (2013.01); *H04N 21/4826* (2013.01); *H04N 21/4882* (2013.01); *H04N 21/812* (2013.01); *G09G 2354/00* (2013.01)

(56) References Cited

U.S. PATENT DOCUMENTS

| | | | |
|---|---|---|---|
| 2007/0150833 A1* | 6/2007 | Kim | H04N 5/445 715/808 |
| 2011/0004845 A1* | 1/2011 | Ciabarra | G06F 3/0481 715/808 |
| 2014/0150048 A1* | 5/2014 | Oh | H04N 21/4345 725/132 |
| 2015/0143406 A1* | 5/2015 | Cho | H04N 21/4131 725/32 |
| 2015/0212675 A1* | 7/2015 | Firstenberg | G06F 3/0484 715/747 |
| 2016/0088359 A1* | 3/2016 | Vaidhyanathan | H04N 21/4882 725/40 |

* cited by examiner

METHODS AND DEVICES FOR DISPLAY DEVICE NOTIFICATIONS AND KEY HANDLING

CROSS-REFERENCE TO RELATED APPLICATIONS

This application claims priority to U.S. Provisional Application No. 62/145,361 titled SYSTEM AND METHODS FOR DISPLAY DEVICE NOTIFICATIONS filed on Apr. 9, 2015, the content of which is expressly incorporated by reference in its entirety.

This application is related to the concurrently filed U.S. patent application titled: METHODS AND DEVICES FOR DISPLAY DEVICE NOTIFICATIONS, the disclosure of which is expressly incorporated by reference in its entirety.

FIELD

The present disclosure relates to electronic devices and applications, and more particularly to methods and devices for display device notifications.

BACKGROUND

Electronic notifications and the display of these electronic notifications are typically non-interactive in nature or require a user to interact fully with the notification. Non-interactive notifications are often not effective at delivering content to a user. Fully interactive notifications are often intrusive to presentation and enjoyment of content on a display device. For this reason, it is desirable to have lower frequency, and less intrusive, notifications that are still interactive and functional.

Moreover, electronic notifications are often associated with a particular display device, and that particular display device's internal architecture. This makes it difficult for third-party sources, unfamiliar with the display device's internal architecture, to provide a user with electronic notifications on the particular display device. For this reason, it is desirable to have a system that seamlessly processes different types of electronic notifications, from a variety of different sources, including third-party sources, and displays these electronic notifications on the display device.

BRIEF SUMMARY OF THE EMBODIMENTS

Disclosed herein are methods and devices associated with display device notifications. One embodiment is directed to a method for presenting a notification on a display device. The method includes identifying, by a display device, a notification. The method also includes registering, by the display device, a key handling event for the notification, wherein the key handling event is a user input based on a type of the notification and content presented on the display device. The method also includes presenting, by the display device, a first graphic, wherein the first graphic is a graphical element overlay including information related to the notification, and wherein presentation of the first graphic is based on the type of the notification. The method also includes detecting, by the display device, the key handling event while the first graphic is presented. The method also includes presenting, by the display device, a second graphic based on detection of the key handling event.

In one embodiment, by registering the key handling event, the display device blocks the user input such that the user input can only be used to interact with the first graphic for a pre-determined time.

In one embodiment, once the pre-determined time expires, the user input is no longer blocked. In an alternate embodiment, the pre-determined time is dictated by the type of the notification. In an alternate embodiment, the pre-determined time is five seconds.

In one embodiment, the user input is a specific key associated with a remote control for the display device, such that the key handling event is sent to the display device by the remote control.

In one embodiment, the user input can be pre-determined by personal settings of the user.

In one embodiment, the display device registers the key handling event based on the type of the notification, such that the user input is a responsive command to the notification.

In one embodiment, the display device registers the key handling event based on the content presented on the display device, such that the user input will not interfere with control of the content presented on the display device.

In one embodiment, the display device assigns the notification a priority level, the priority level based on the type of the notification, such that the notification is only presented, by the display device, at a time associated with the priority level. In an alternate embodiment, the priority level is one of immediate, one-hour delay, one-day delay, one-week delay, or one-month delay.

In one embodiment, the notification has a pre-determined presentation time, such that the notification is presented, by the display device, at a date and a time associated with the pre-determined presentation time.

In one embodiment, the type of the notification is one of alerts, tips, recommendations, advertisements, or messages.

In one embodiment, upon presenting the second graphic, the display device registers a new key handling event, the new key handling event related to the second graphic and functioning as a link to a destination, application, silo, input, or other notification, such that detecting the new key handling event serves to either select the second graphic and follow the link or cancel the second graphic and not follow the link.

In one embodiment, upon presenting the second graphic, the display registers a new key handling event, the new key handling event related to the second graphic and functioning as a user selection to one of a plurality of second options, such that detecting the new key handling event serves to select one of the plurality of second options or cancel the second graphic and not select any of the plurality of second options.

In one embodiment, the display device sends the notification to a tandem device, the tandem device in communication with the display device.

Another embodiment is directed to a display device including a display and a controller coupled to the display. The controller is configured to identify a notification. The controller is further configured to register a key handling event for the notification, wherein the key handling event is a user input based on a type of the notification and content presented on the display device. The controller is further configured to present a first graphic, wherein the first graphic is a graphical element overlay to include information related to the notification, and wherein presentation of the first graphic is based on the type of the notification. The controller is further configured to detect the key handling event while the first graphic is presented. The controller is further configured to present a second graphic, wherein the second graphic is based on detection of the key handling event.

In one embodiment, by registering the key handling event, the display device blocks the user input such that the user input can only be used to interact with the first graphic for a pre-determined time. In an alternate embodiment, once the pre-determined time expires, the user input is no longer blocked.

In one embodiment, the display device is in communication with a tandem device, such that the display device sends the notification to the tandem device.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
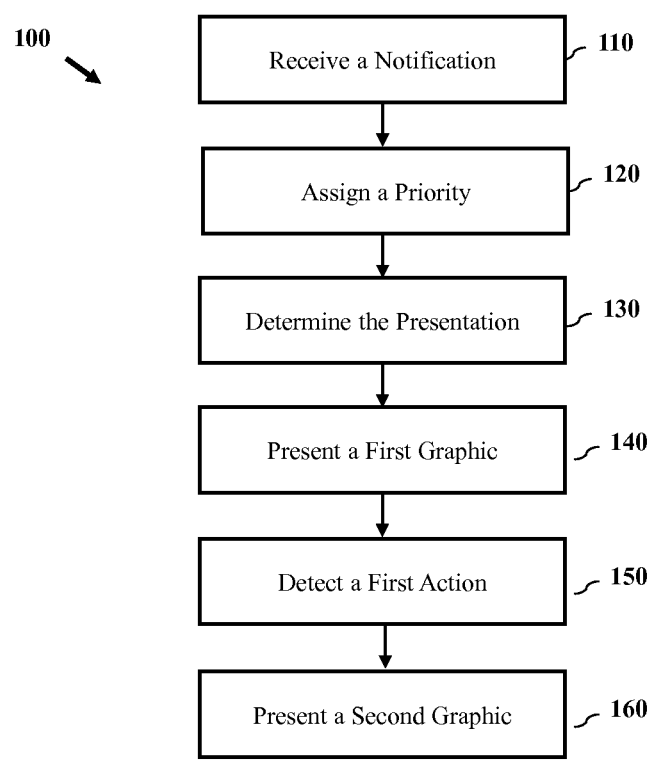
FIG. 1 depicts a graphical representation of a process for presenting a notification on a display device according to one or more embodiments.

Systems and methods are provided for presentation of notifications on a device. In one embodiment, a Global Notification system is a universal place to receive, store, and display user-centric notifications and device-centric notifications, including system messages, tips, recommendations, as well as Cloud recommendations, ads, and generic messages.

The Global Notification system provides an unobtrusive and engaging system that informs a user of received notifications. A number of user interface (UI) components are introduced to the user by the Global Notification system, including Toasts, Dialog-Single Function, Dialog-Multi Functions, and a Notification Canvas. The system is to be a unified notification system, whereby all parts of the system (Toasts, Dialogs, and the Notification Canvas) follow consistent patterns, functionality, and visual styles. The system will give the user a clear understanding about how to interact with the various UI components. Helpful information, assistance, and other useful functions are to be provided for each type of UI component, by the Global Notification system, to ensure proper use and parameter validation.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

As disclosed herein, the Global Notification system informs a user of system-based, cloud-based, and device-based information, through notifications. This is done by presentation of a Toast, subsequent and related Dialogs, and a Notification Canvas, all on the display device.

Graphically, the Toast does not take the display device's focus away from the main or primary view. In other words, the user has the ability to continue to view content on the display device, uninterrupted and irrespective of the Toast's presence on the screen. In an embodiment, the Toast is shown on an edge of a display, such that it does not block content on the display device. In an alternate embodiment, the Toast is opaque, such that content can be viewed "through" the Toast. Graphically, Toasts are designed to be visually richer than standard notifications.

The user has the ability to interact with Toasts via a specific button on a remote control or other external device controlled by the user. By interacting with the Toast, the user can get more information about the specific notification represented by the Toast, and use the Toast as a link to transition to a destination such as a silo, application, input, or a Dialog. There is no user interaction with certain types of Toasts, such as generic messages. If there is no user interaction with a Toast, regardless of whether the Toast allows for interaction, the Toast is dismissed after five seconds or another preset time interval. Likewise, regardless of whether or not a Toast has been dismissed by a user, the notification associated with the Toast is sent to the Notification Canvas. To make these notifications accessible to the user, they are placed on the Notification Canvas in the Global Notification System.

The user is able to access the Notification Canvas from the display device. This allows the user to view and interact with all notifications stored on the Global Notification system.

Interaction with notifications, Toasts, and Dialogs, from the Notification Canvas can provide additional information and function as a link to transition to a destination such as a silo, application, input, or another Dialog. The Global Notification system has a plurality of distinct silos, such that each silo can receive silo-specific notifications. When any one of the plurality of distinct silos is engaged by the system, the silo-specific notifications associated with that silo will be shown to the user. Silos may be compartmentalized aspects of the user experience, including different levels of system access, different applications, and different modes in which the display device operates, such as live-TV mode (e.g., broadcast), on-demand content, content associated with a media library, network content (e.g., internet, streaming, etc.) and content sources in general. In other embodiments, content sources may be arranged as silos that may be accessed for presentation. In one embodiment, the following actions trigger a transition to the destination application, silo, or input if the user is not already there: (1) selecting a notification on the Notification Canvas, linked to a silo; (2) selecting a Dialog-Single Function, linked to a silo; or (3) selecting an action on a Dialog-Multi Functions, linked to a silo. Thus, when content or data is presented associated with a particular silo, the notification canvas can be presented for notifications from one or more other silos. According to another embodiment, selection and/or interaction with the notification canvas can transition the display output of a device from a current selected silo source to another based on detected interaction with a notification.

Architecturally, a typical workflow, for the creation of a Toast, is as follows. Any external application or device can send a notification to the Global Notification system of a display device. A new notification is then written into the database for the Global Notification system. An application server of the display device is informed that a new notification has been added to the system based on the addition of the notification to the Global notification system. A new Toast will be developed for user interaction, based off of the creation parameters initially sent with the notification. The new Toast is shown on the display device. And, finally, when the new Toast is shown, a user can use a remote control or other external device to interact with the Toast. Subsequent Toast interaction is largely dependent on the notification's creation parameters and Dialog-type.

From the user perspective, the Toast is the entry point for the Global Notification system. Whenever a notification is processed by the Global Notification system, a Toast will be shown to the user. For any Toast that requires a user response, the system will monitor action by the user. The system monitors for a responsive action, known as a key-handling event. During this monitoring process, the system will "block" a user input, associated with a pre-determined key-handling event, such that the user input can only be used to act in response to the Toast. This blocking process and key-handling event monitoring process are time limited, and have an expiry component.

In an embodiment, for Dialog-Single Function, the options from which a user could choose for responsive action can include yes, no, ok, or cancel. With Dialog-Single Function, there is a predefined behavior and response by the system. For Dialog-Multi Functions, the Global Notification system will handle the Dialog. In an embodiment, with Dialog-Multi Functions, the user can take a responsive action, based on the Toast, and the Dialog-Multi Functions may check a field or perform some other type of selective action.

For Dialog-Single Function, a user accesses and interacts with the Dialog through a Toast, such that interacting with the Toast reveals additional information about the Toast in a Dialog. The user is able to take action responsive to the Toast. For certain notification types, such as reminders, the additional information associated with the Toast is shown directly on the display device without requiring a user to interact with the Toast.

The Dialog-Single Function is selectable. Upon user selection of a Toast associated with a Dialog-Single Function, the display device's focus is taken away from the main view, such that the display is focused on a Dialog, instead of the previously displayed content. The Dialog-Single Function provides an additional function or action by the Global Notification system. Depending on the notification type, these Dialogs can function as a link to a destination, such as an application, silo, input, or another Dialog. These Dialogs have timeout functions, or expiries, whereby a user may only interact with the Dialog for a predetermined amount of time. This expiry can be shown to the user, on the dialog, with a countdown indicator or status bar. Taking a responsive action will immediately cause the system to interact with the Dialog. Pressing a predefined user key, such as "Back," will immediately dismiss the Dialog. The Dialogs are also stored on the Notification Canvas, such that the user can view all of the various notifications from one location and more easily access the individual Dialogs associated with the various notifications.

When the user is required to choose a specific action from a list of multiple actions, the Dialog-Multi Functions is launched. The Dialog-Multi Functions are displayed by the posting application, which can be triggered by the Dialog-Single Function. In an embodiment, when new media is detected, the Dialog-Single Function is displayed. If the user interacts with the notification, the intent will be triggered for displaying the Dialog-Multi Function, on the display device. A Dialog-Multi Functions takes a user selection or action and transforms this selection or action into devices, content, programs, etc. Third parties can program customizable actions for Dialog-Multi Functions.

In an embodiment, if either a software update or device detection notification is received, selecting the Dialog-Single Function would automatically trigger a Dialog-Multi Functions. These Dialog-Multi Functions are only available for Global Notification system generated notifications. One of the exceptions to this general restriction of availability is that a DVB-C Dongle, when connected to the display device, will automatically trigger and display a Dialog-Multi Functions directly, such that a user will be able to select the device associated with the DVB-C Dongle.

In some circumstances, a Dialog-Multi needs to be dismissed or updated while it is simultaneously being displayed. The Global Notification system allows for dynamic dismissal or updates to a given notification. For example, a media device is detected when a USB device is either plugged in or removed. When a media device is detected, and the Dialog-Multi Function is shown, the new device could be dynamically displayed in the Dialog. If the media device is removed, and the Dialog-Multi Function is still shown, the Dialog could be dismissed automatically by the system.

There are a number of different notification classes or types which may be implemented on the Global Notification system. These notification classes include, but are not limited to, content detection (e.g., new content), alerts (e.g., device detection, TV program reminders, available system updates, live input detection), tips (e.g., tips to use silo, showcasting silo features), generic messages (e.g., "wear your 3-D glasses!"). There are also a number of notification classes implemented on the Global Notification system which are received from a cloud or guide, including, but not limited to, recommendations (e.g., new movies/shows in VOD, recommended apps, recommended TV programs), ads (e.g., web links), and generic messages (e.g., Today's weather is . . . , Happy New Year!).

In an embodiment, the notifications are dynamically updated, on the Global Notification system, by the notification source and based on external changes. For example, if programming changes are made externally (e.g., a channel change by a third party provider), the system will update any notification associated with the programming change (e.g., if channel 8 switches to channel 6, a reminder notification could be dynamically updated to read "Your favorite show is on Channel 6 in five minutes"). This way, the user will not be receiving notifications for incorrect programming or other "false-notifications."

The UI components disclosed: Toasts (including the various individual notification classes), Dialogs, and the Notification Canvas may contain other functional and graphical elements in addition to the text. Additional graphical elements may include thumbnails, icons, dynamic movement, and sound. These additional elements shall be integrated in a way such that performance in displaying device notifications is not impacted. Furthermore, these additional elements are integrated such that disruption to the user experience of the display device is minimized. Moreover, additional graphical elements will serve to improve the user experience by providing the user with a visually appealing user interface.

At a high-level, the notification system is configured to receive a notification, process the notification, display the notification, monitor for a user action, and take further steps with the notification in response to the user action.

By receiving a notification, the Global Notification system automatically stores the notification in the Notification Canvas. The Notification Canvas is the unitary location where a user can view and interact with all notifications stored on the system. If any of the following occurs, the notification is removed from the Notification Canvas: (1) a notification's Dialog-Single Function is consumed, such that the Dialog is no longer needed; (2) a user takes the required action for the specific type of notification; or (3) the notification has expired.

By processing a notification, the Global Notification system prioritizes and queues the notification. In one embodiment, notifications are prioritized into three distinct priority values. First, alerts (e.g., system updates) are displayed on Power ON of the display device. Second, alerts and generic messages are displayed immediately after the display device receives the notification. For specific types of notifications, the Dialogs are displayed right after the notification is pushed to the display device (e.g., for TV reminders, the Dialog-Single Function is displayed; for DVB-C Dongle the Dialog-Multi Functions is displayed). Third, recommendations, tips, and ads are displayed on pre-defined schedules. In an alternate embodiment, the notifications have pre-set dates and times for display.

Toasts are generally shown immediately after the notification is received. However, if there is a backlog of notifications, the following queuing scheme can be used to order the notifications (as listed from highest priority to lowest priority): (1) alerts, (2) generic messages, (3) recommendations, (4) ads, and (5) tips.

Once queued, a Toast is displayed. In an embodiment, the Toast is a graphical presentation of the notification content. Additionally, the Toast has added functionality: (1) a user can interact with the Toast via a specific user input on a remote control or other external device; and (2) the Toast has a unique graphical layout and placement.

Referring now to the figures, FIG. 1 depicts a graphical representation of a process for presenting a notification on a display device. The process 100 for the display device begins when the display device receives a notification 110. Upon receipt of the notification 110, the display device will assign a priority 120 to the notification. This priority will help the display device determine the presentation 130 for the notification, on the display device. The display device will then present a first graphic 140. Upon presentation of the first graphic 140, the display device will detect a first action 150. Finally, and responsive to this first action 150, the display device will present a second graphic 160.

Figure 2:
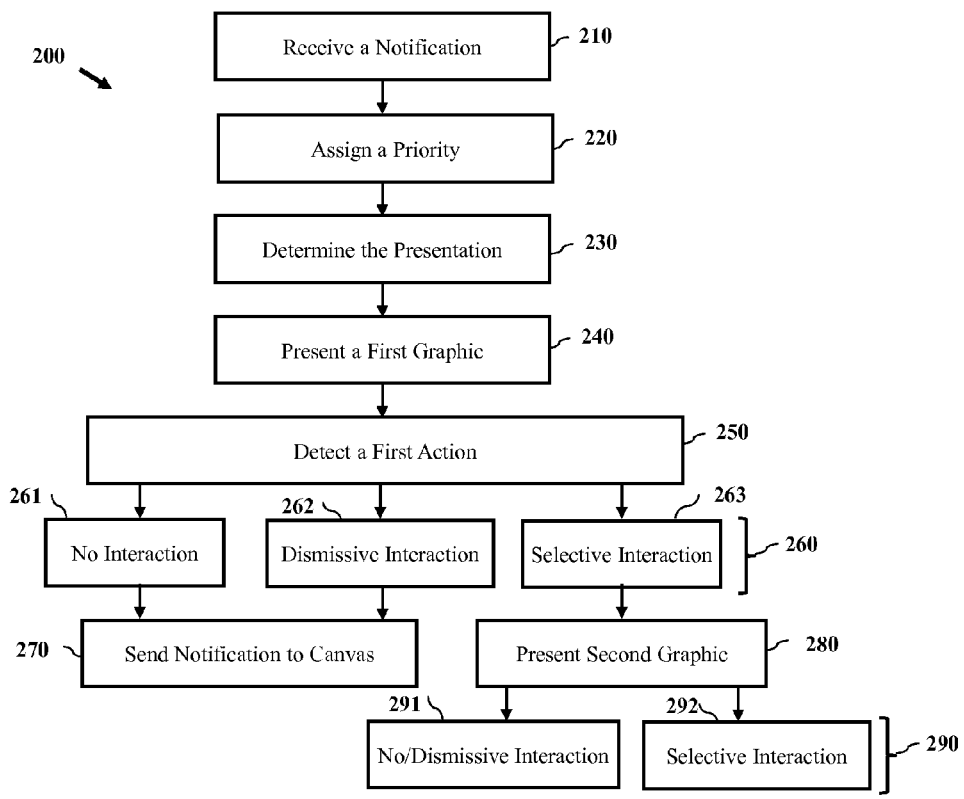
FIG. 2 depicts a graphical representation of a process for presenting a notification on a display device according to one or more embodiments.

FIG. 2 depicts a graphical representation of a process for presenting a notification on a display device. The process 200 for the display device begins when the display device receives a notification 210. Upon receipt of the notification 210, the display device will assign a priority 220 to the notification. This priority will help the display device determine the presentation 230 for the notification, on the display device. The display device will then present a first graphic 240. Upon presentation of the first graphic 240, the display device will detect a first action 250. The action detected by the display device is one of a plurality of first actions 260. The plurality of first actions 260 includes no interaction 261, dismissive interaction 262, and selective interaction 263. If the display device detects either no interaction 261 or a dismissive action 262, the display device will not present a second graphic 280. Rather, the display device will send the notification to a canvas 270. However, if the display device detects a selective interaction 263, the display device will then present a second graphic 280 responsive to the selective interaction 263. This second graphic 280, much like the presentation of the first graphic 250, allows for a plurality of actions. The plurality of second actions 290, responsive to presentation of the second graphic 280, includes no/dismissive interaction 291 and selective action 292.

Figure 3:
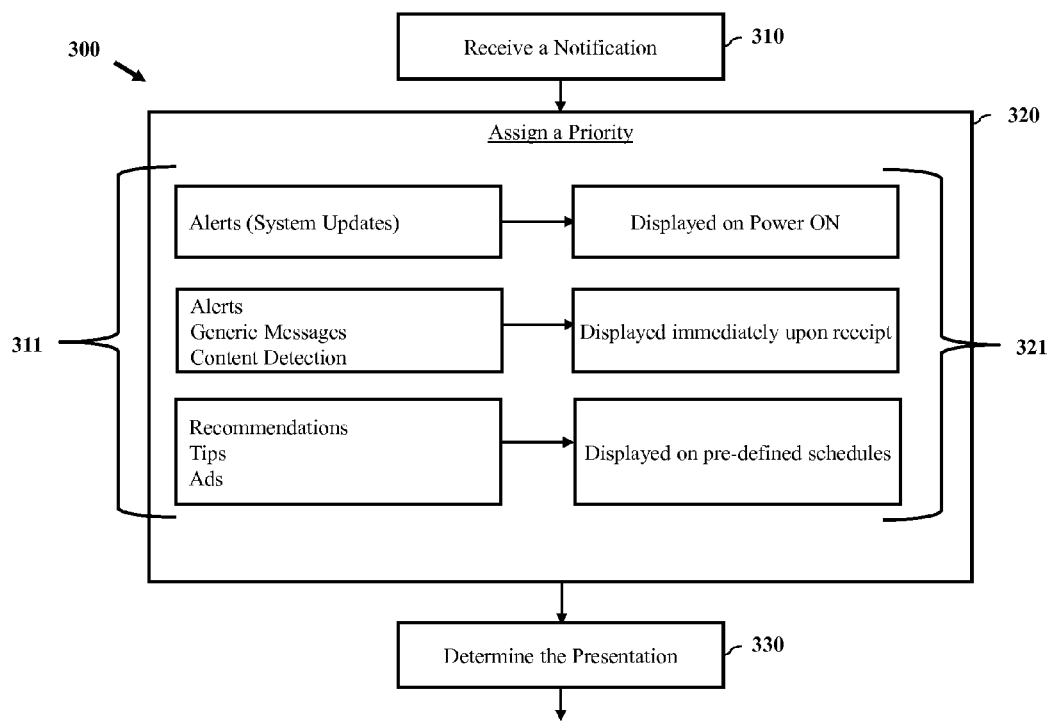
FIG. 3 depicts a graphical representation of a prioritization scheme for a notification according to one or more embodiments.

FIG. 3 depicts a graphical representation of a prioritization scheme for a notification. The prioritization scheme 300 for a notification begins when the display device receives a notification 310. Upon receipt, the display device is configured to assign a priority 320 to the notification. The notification is organized by its notification type 311. There are a plurality of notification types 311 including alerts for system updates, alerts, generic messages, content detection, recommendations, tips, and ads. The display device assigns each notification type 311 a priority value 321, such that the priority value 321 is associated with the notification. There are a plurality of priority values 321 including displaying on power ON, displaying immediately upon receipt, and displaying on pre-defined schedules. Once the individual notification has been assigned a priority value 321 according to its notification type 311, the display device then determines the presentation 330 for the notification. Presentation of the notification will be based on the priority value 321 that has been assigned 320.

Figure 4:
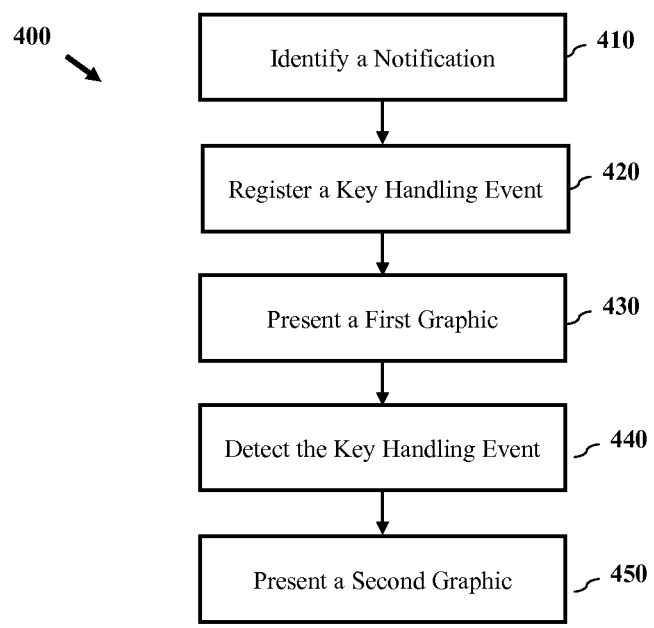
FIG. 4 depicts a graphical representation of a process for a key handling event according to one or more embodiments.

FIG. 4 depicts a graphical representation of a process for a key handling event. The process 400 for the display device begins when the display device identifies a notification 410. Upon identification of the notification 410, the display device will register a key handling event 420 for the notification. This key handling event is used to detect a user action in response to the notification when the notification is displayed on the display device. Once the key handling event has been registered 420, the display device will present a first graphic 430. Upon presentation of the first graphic 430, the display device will detect the key handling event 440. Finally, and responsive to the key handling event 440, the display device will present a second graphic 450.

Figure 5:
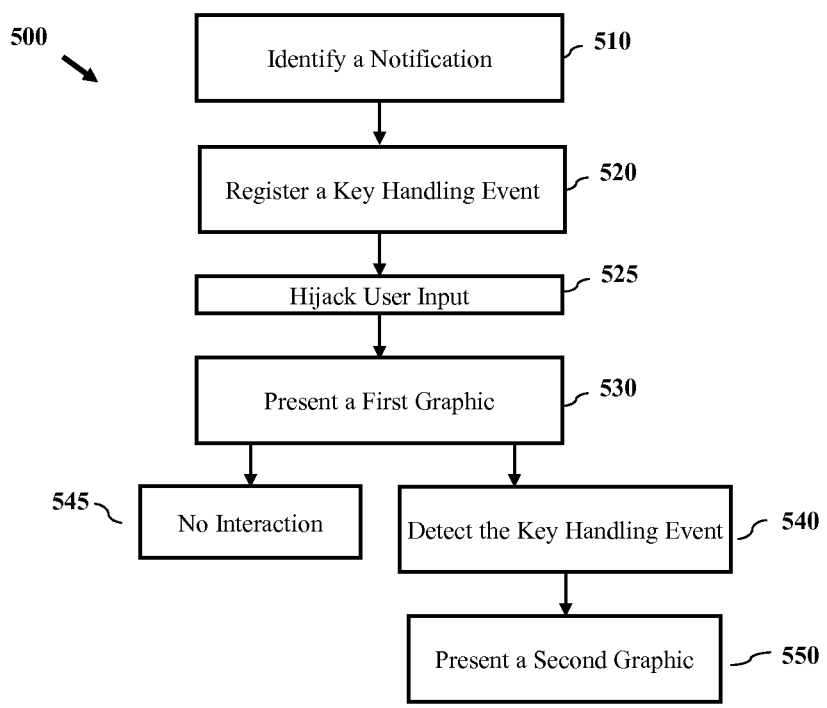
FIG. 5 depicts a graphical representation of a process for a key handling event according to one or more embodiments.

FIG. 5 depicts a graphical representation of a process for a key handling event. The process 500 for the display device begins when the display device identifies a notification 510. Upon identification of the notification 510, the display device will register a key handling event 520 for the notification. This key handling event is used to detect a user action in response to the notification when the notification is displayed on the display device. Once the key handling event has been registered 520, the display device will block a user input 525. The user input is blocked, such that the user input can only be used as an input to the key handling event; while blocked, the user input can not be used for any other functionality than as associated with the notification and the registered key handling event. Once the user input associated with the key handling event has been blocked, the display device will present a first graphic 530. Upon presentation of the first graphic 530, the display device will detect the key handling event 540. Finally, and responsive to detection of the key handling event 540, the display device will present a second graphic. In the alternative, if there is no interaction 545 with the user input associated with the key handling event, the display device will not detect a key handling event, and not present a second graphic.

Figure 6:
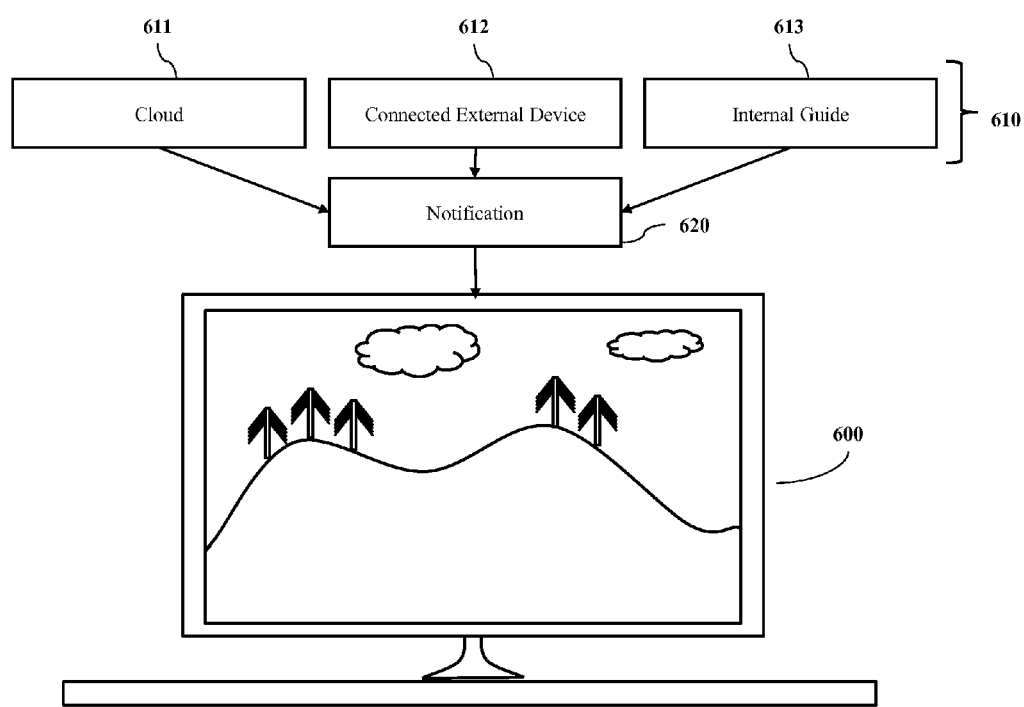
FIG. 6 depicts a graphical representation of a plurality of notification sources according to one or more embodiments.

FIG. 6 depicts a graphical representation of a plurality of notification sources. The display device 600 can be connected to a plurality of sources 610. This connection to the display device 600 can be a hard-wired connection, or a wireless connection via Wifi, Bluetooth, Internet, or other wireless connection means. This plurality of sources 610 can include a cloud 611, a connected external device 612, and an internal guide 613. In an exemplary embodiment, the cloud 611 can be any cloud-based database connected via the Internet or any other network. The connected external device 612 can be any electronic device connected to the display device 600. In an exemplary embodiment, the connected external device 612 can be any one of a computer, tablet, phone, recorder, cable box, media player, sound device, other display device, or other audio/visual equipment. The internal guide 613 is the internal architecture associated with the display device. In an exemplary embodiment, the internal guide 613 can include anything associated with the display device 600, such as internal smart-TV applications, internal A/V systems, internal applications, and internal hardware. Any of the plurality of sources 610 can send a notification 620 to the display device 600. Transmission of the notification 620 to the display device 600 can be through a hard-wired connection, or a wireless connection via Wifi, Bluetooth, Internet, or other wireless connection means.

Figure 7:
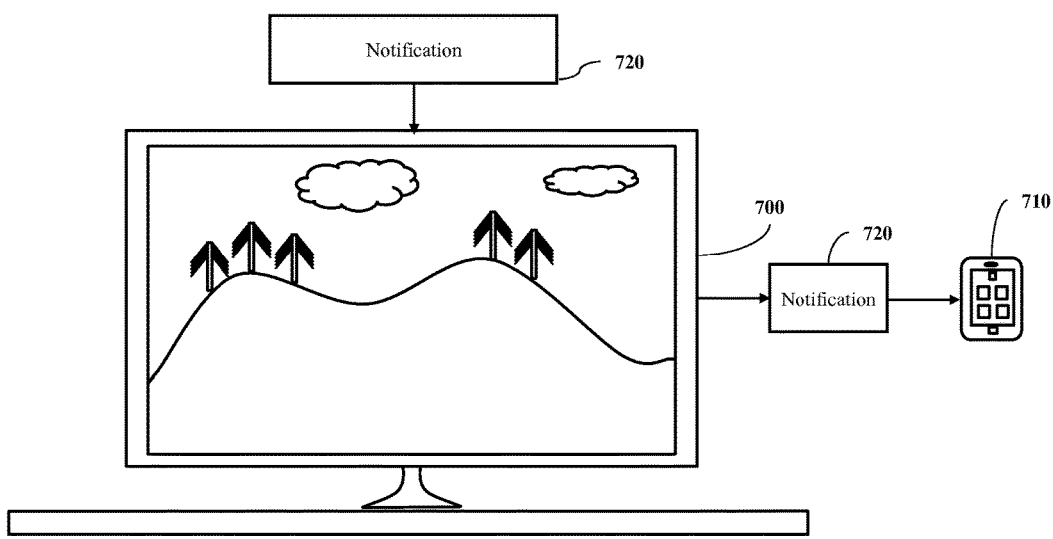
FIG. 7 depicts a graphical representation of a tandem device according to one or more embodiments.

FIG. 7 depicts a graphical representation of a tandem device. A display device 700 and the tandem device 710 are linked to, and in communication with, one another. The tandem device 710 can be any one of a computer, tablet, phone, recorder, cable box, media player, sound device, other display device, or other audio/visual equipment. The display device 700, which receives a notification 720, can subsequently send the notification 720 to a tandem device 710. Transmission of the notification 720 from the display device 700 to the tandem device 710 can be through a hard-wired connection, or a wireless connection via Wifi, Bluetooth, Internet, or other wireless connection means. The tandem device 710 can then act locally on the notification 720 received from the display device 700.

What follows are more detailed descriptions of each of the UI components, including Toasts, notification classes or types, Dialog-Single Function, Dialog-Multi Functions, and the Notification Canvas.

Figure 8:
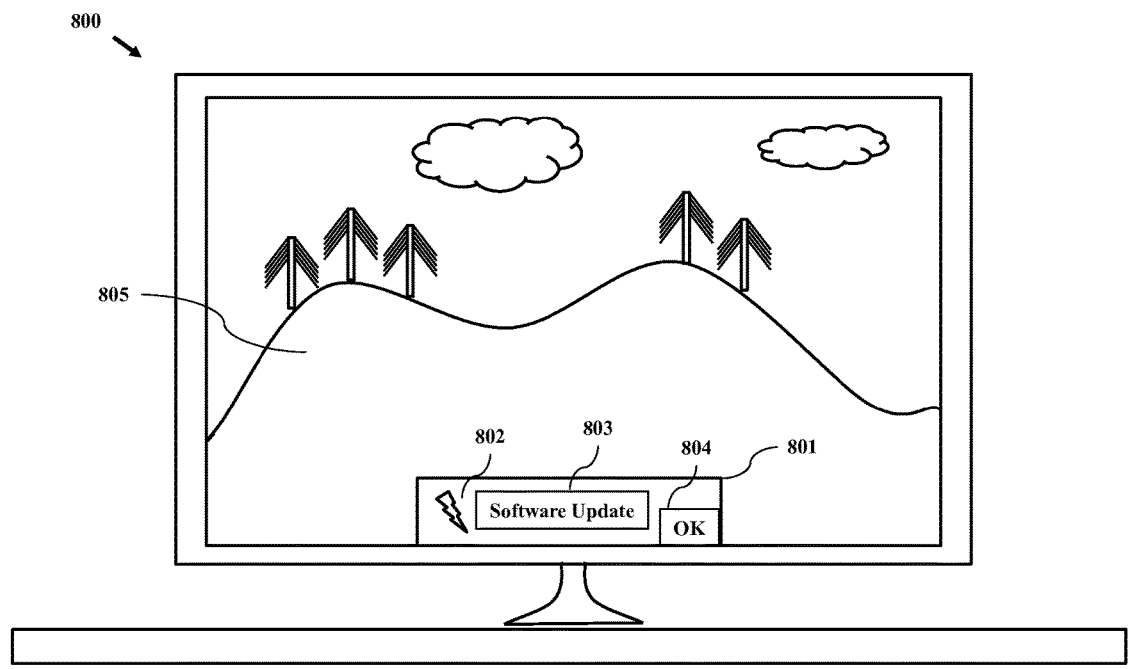
FIG. 8 depicts a graphical representation of a first graphic, such as a Toast according to one or more embodiments.

FIG. 8 depicts a graphical representation of a first graphic, more specifically a Toast. Once a system/cloud notification is pushed to the display device, and prioritized, a Toast is presented. As shown, a display device 800 is used to display a Toast 801. Depending on the notification class, the Toast may have a single/multiple icon or thumbnails (which are not selectable). The Toast includes a visual cue 802, which helps quickly inform a user of the type of notification and how the user can interact with the notification. The Toast also includes a message 803 which is associated with the particular notification.

The Toast is a graphical cue, shown on the edge of the display device 800. By being displayed on the edge of the display device 800, the Toast 801 is minimally intrusive to the content 805, which the user is enjoying. However, the user is able to interact with the Toast 801 in order to inquire for more information. The Toast 801 provides the user with the ability to select some type of action 804, such that upon selecting the action 804 the Toast 801 will perform some additional function.

In the embodiment shown, the Toast 801 is related to a software update notification, as indicated by the message 803. By selecting the action 804 associated with the Toast 801, the user would effectively tell the display device 800 "Download the software update now."

This interaction occurs by pressing a pre-determined key, such as the "Info" key, while the Toast is displayed on the screen. Pressing any other key would have no affect on the Toast. Alternatively, the user can decide to not interact with the Toast, in which case no further action is taken. If there is no user interaction, the Toast will disappear from the display after five seconds (or some other predetermined time). The Toast is then subsequently stored on the Notification Canvas. Each notification class further follows a specific pattern.

The Toast shall typically be shown during: (1) a silo transition; (2) as a precursor to a Dialog-Single Function or a Dialog-Multi Functions; (3) whenever a notification is displayed; and (4) whenever internal system settings are displayed.

While most notifications generate a Toast, in an alternate embodiment an application may simply update the content of an existing notification or re-insert a notification into the Notification Canvas. If this is the case, the Toast presentation is bypassed, and the Toast not shown.

In an embodiment, if similar Toasts are pushed to the display device at the same time, they are grouped and shown with one message (e.g., five movie suggestion Toasts could be grouped into a single message reading "5 New Movie Pics for You"). If different notifications are pushed to the display device at the same time, they are queued, such that once a notification is dismissed the next notification is shown.

In an embodiment, when a Toast is presented while a screensaver is running, the user is able to see the Toast and interact with it, regardless of whether the display device is in screensaver or standby mode. Upon the user's interaction with the Toast, the screensaver is dismissed.

Another important and related set of UI components are the various notification classes or types. The notification classes include: Content Detection, Alerts, Tips, Recommendations, Ads, and Messages.

Content Detection notifications are triggered when (1) a new USB device including media content is connected to the display device and scanned; (2) a scanned USB device with new media content is re-connected to a display device; or (3) a new media is found on a registered Cloud storage. Content Detection is shown the first time new content is found. If new content is not scanned, this notification is not shown after rebooting the display device, until the scan is complete.

Alerts notifications are pushed by the Global Notification system. Alerts inform a user of non-critical events that are going to happen immediately, or within a relatively short period of time. These notifications require a user's immediate attention. Depending on the severity of the alert, it may be linked to a destination app, silo, input, or a Dialog. Alerts are shown once they are received by the system. If the alerts have not expired, the alerts are also shown after rebooting the display device.

Tips notifications are pushed by the Global Notification system. Tips highlight features that have never been used, or rarely been used, by the user over the duration of using the display device. Tips are also shown to the user on pre-defined schedules for features that have not been used after a specific duration. Each tip is linked to a specific silo, input, or panel on the display device.

Recommendations notifications are pushed from the cloud and presented to the user via this notification. Based on the recommendation type, these notifications are linked to an app or silo, such that taking action on a recommendation notification would facilitate a transition to the linked app or silo. Recommendations are shown on pre-defined schedules.

Ads notifications refer to content that is not available on display device. Ads are shown on pre-defined schedules.

Messages notifications are pushed by the Global Notification system, through an internal guide, a connected external device, or a cloud. These notifications are not linked to any view and they are not stored on the Notification Canvas. Generic messages pushed by the system are related to the user's current viewing activity (e.g., "Wear Your 3D Glasses"). Generic messages pushed by the cloud relate to the user's context (e.g., if it's New Year's Eve in the user's particular location, a greeting message is sent). The originator of these generic messages (either cloud or system) is responsible for sending them, when appropriate, to the system. They are presented by the display device upon receipt.

The Global Notification system can have a Message Center, which broadcasts a message count on how many messages it has sent to the system. Receiving this count, the system can respond in a number of ways. In an embodiment, the system can receive the count and display a Toast, indicating the message count (e.g., "5 new Messages!"). In an alternate embodiment, the system can receive the count and show the Message Center info in a panel. In an alternate embodiment, the system allows for the user to open Message Center and delete the message associated with the count. In an alternate embodiment, Message Center can resend the message after a display device reboot scenario.

Figure 9:
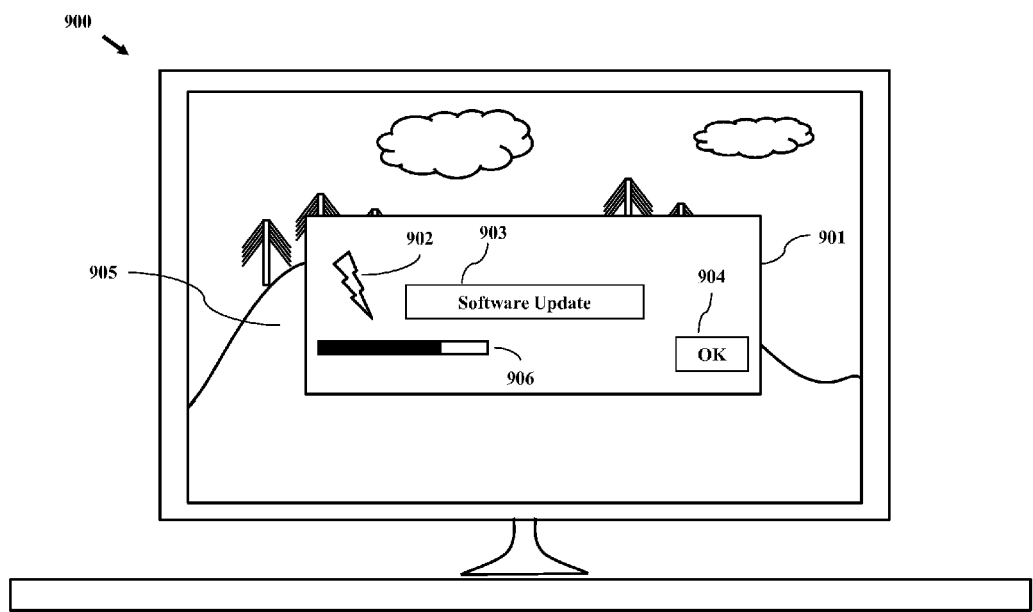
FIG. 9 depicts a graphical representation of a second graphic, such as a Dialog-Single Function according to one or more embodiments.

FIG. 9 depicts a graphical representation of a second graphic, more specifically a Dialog-Single Function. A Dialog-Single Function is displayed on a display device 900 when user interacts with a Toast, or receives specific notifications (e.g., TV Reminders), which may be linked to a Dialog. The Dialog-Single Function includes a Dialog 901 which, depending on the notification class, may have a single/multiple icon or thumbnails (which are not selectable). The Dialog-Single Function includes a visual cue 902, which helps quickly inform a user of the type of notification and how the user can interact with the notification. The Dialog 901 also includes a message 903 which is associated with the particular notification.

The user is able to interact with the Dialog 901. The Dialog 901 provides the user with the ability to select some type of action 904, such that upon selecting the action 904 the Dialog 901 will perform some additional function. The Dialog-Single Function takes the focus of the display device 900 away from the content 905. The Dialog-Single Function also includes a countdown indicator 906 which indicates the time remaining before the Dialog's timeout.

In the embodiment shown, the Dialog 901 is related to a software update notification, as indicated by the message 903. By selecting the action 904 associated with the Dialog 901, the user would effectively tell the display device 900 "Download the software update now."

Depending on the notification type, these Dialogs function as a link to a destination (e.g., app, silo, input or another Dialog). These Dialogs have timeouts, similar to the other UI components, such as the Toast. However, the notification originator can define a specific time duration for Dialogs. The exact same Dialog is used on the Notification Canvas. Once the Dialog-Single Function is consumed, it will be removed from the Notification Canvas.

A user should be able to interact with Toasts (except ads and generic messages) received while a Dialog-Single Function is being displayed. Upon the user's interaction with the Toast, the Dialog-Single Function Dialog on the screen is dismissed and sent to the Notification Canvas, and the Dialog-Single Function for the newly received Toast appears. Examples of this interaction could include a Dialog-Single Function reminder in display, user connecting a USB to a display device, while the reminder Dialog is still on screen, a device detection Toast is shown, user interacting with the device detection Toast by pressing the "Info" key, or the reminder Dialog is dismissed and the Dialog-Single Function for Device Detection is shown.

A user can dismiss a Dialog-Single Function by allowing it to timeout, pressing the "Back" button on the remote control, or switching silos while a Dialog-Single Function is presented on the display. If dismissed, the Dialog-Single Function can subsequently be accessed on the Notification Canvas.

In an embodiment, selecting the Dialog-Single Function for software updates will trigger the following Dialog-Multi Functions.

Figure 10:
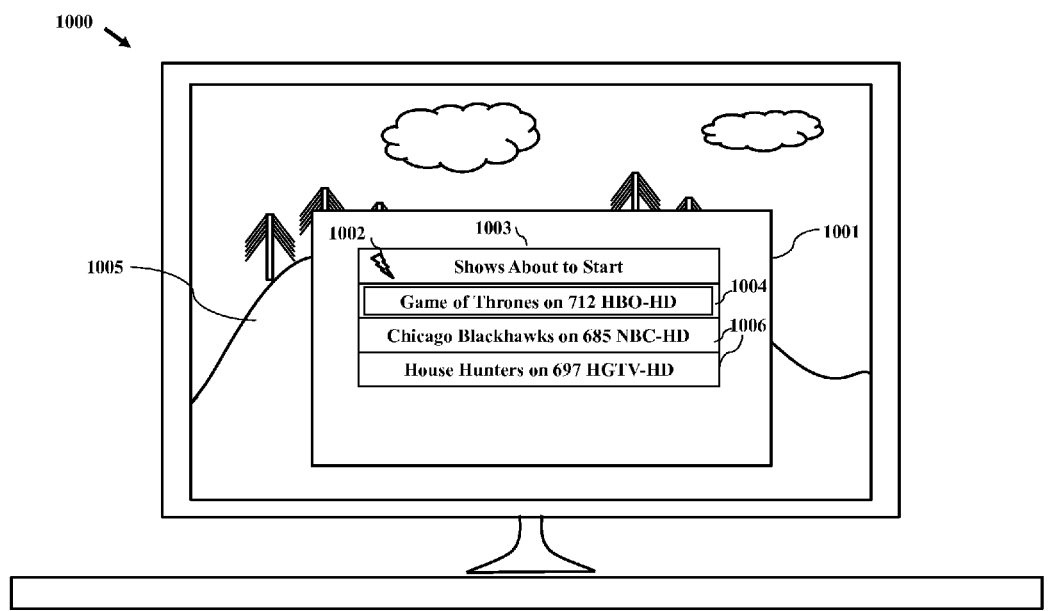
FIG. 10 depicts a graphical representation of a second graphic, such as a Dialog-Multi Functions according to one or more embodiments.

FIG. 10 depicts a graphical representation of a second graphic, more specifically a Dialog-Multi Functions. A Dialog-Multi Functions is displayed on a display device 1000 when user interacts with a Toast, or receives specific notifications (e.g., TV Reminders). The Dialog-Multi Functions includes a Dialog 1001 which, depending on the notification class, may have a single/multiple icon or thumbnails (which are not selectable). The Dialog-Multi Functions includes a visual cue 1002, which helps quickly inform a user of the type of notification and how the user can interact with the notification. The Dialog 1001 also includes a message 1003 which is associated with the particular notification.

The user is able to interact with the Dialog 1001. The Dialog 1001 provides the user with the ability to select some type of action 1004, such that upon selecting the action 1004 the Dialog 1001 will perform some additional function. The Dialog-Multi Functions is different than the Dialog-Single Functions, because the Dialog-Multi Functions provides the user with a plurality of decisions from which the user can choose an action 1004. The Dialog-Multi Functions takes the focus of the display device 1000 away from the content 1005.

In the embodiment shown, the Dialog 1001 is related to a user's televisions shows, which are about to start. The notification alerts the user of the shows which are starting, as indicated by the message 1003. The user has a plurality of choices including the selected show, highlighted as the current action 1004, and a plurality of other shows listed as other actions 1006. By selecting the action 1004 associated with the Dialog 1001, the user would effectively tell the display device 1000 "Take me to the show I've selected."

The Dialog-Multi Functions provides the user with the ability to take an interactive and selective role regarding the notification shown. In an exemplary embodiment, a Dialog-Multi Functions is used to indicate, to a user, which of the user's favorite television programs are about to start. The user has the option of selecting one of the multiple television programs shown by the Dialog-Multi Functions. Upon selection of a television program, the Dialog-Multi Function will change the channel on the television, so that the user's selected television program is shown by the television.

In an alternate embodiment, Dialog-Multi Functions are part of other features, including Device Detection Dialog, DVB-C Dongle FTE Dialog, and Software Updates. A Device Detection Dialog will immediately display when the rules apply to new content being detected by the display device and is an exception to the utilization of the system. A DVB-C FTE Dialog is one of the special cases in the Global Notification system. Upon connecting iCast TV USB Dongle to the display device, the Toast and Dialog-Single Function are passed, and this Dialog-Multi Functions is directly shown.

Figure 11:
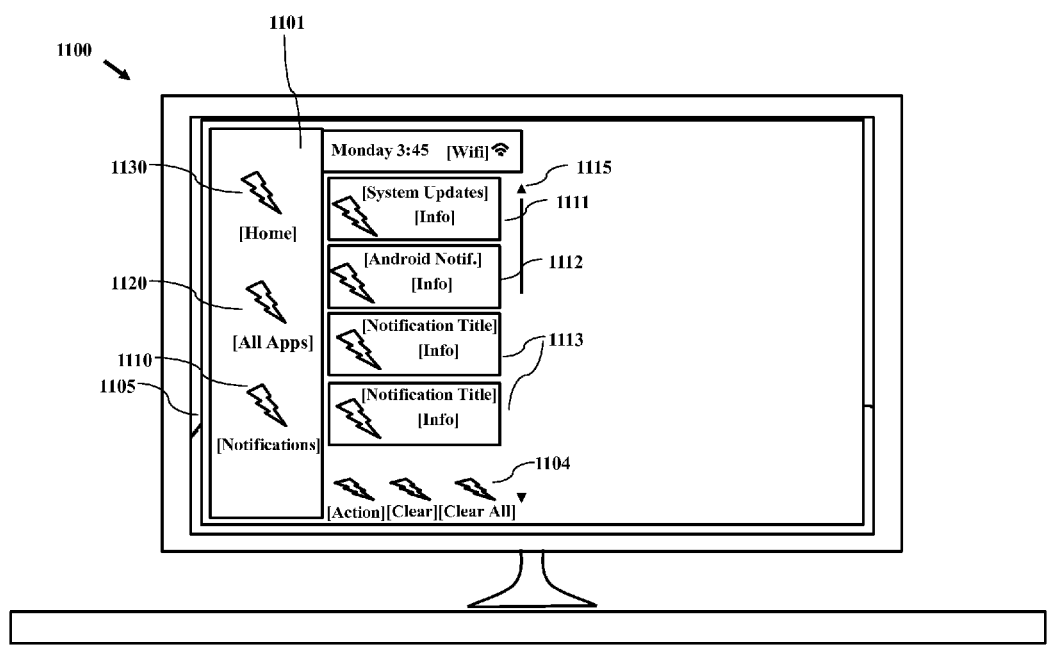
FIG. 11 depicts a graphical representation of a Notification Canvas according to one or more embodiments.

FIG. 11 depicts a graphical representation of a Notification Canvas. Once a system/cloud notification is pushed to the Global Notification system, regardless of whether it is presented as a Toast, it is simultaneously stored on the Notification Canvas 1101. In an embodiment, every notification that shown on the display device 1100 will have a Dialog-Single Function likewise stored on the Notification Canvas 1101 of the Global Notification system. An exception is that generic messages are not stored on the Notification Canvas.

As shown, a display device 1100 is used to display the Notification Canvas 1101. The Notification Canvas 1101 lists a plurality of notifications on the Global Notification system. Some common notifications listed on the Notification Canvas 1101 include system update notifications 1111, android notifications 1112, and other notifications 1113. These updates and notifications are grouped in line items on the Notification Canvas 1101.

Depending on the notification class, the plurality of notifications 1111, 1112, 1113 shown may have a single/multiple icon or thumbnails (which are not selectable) and visual cues, which help quickly inform a user of the type of notification and how the user can interact with the notification. Each of the plurality of notifications 1111, 1112, 1113 shown may likewise include both a title and additional information or messages associated with the particular notification. The user can navigate through the plurality of notifications on the Notification Canvas 1101 using the track bar 1115.

The Notification Canvas 1101 can have either a selected passive state or an active state, where the notification is in focus. Once the user has selected a particular notification from the plurality of notifications, the user can take action 1104 related to the notification selected. In addition to selecting an action 1104 associated with the notification, the user can dismiss and clear the individual notification, or clear all the notifications, from the Notification Canvas 1101. Furthermore, the Notification Canvas can have a plurality of "hotkeys" associated with a user remote or other external device. For example, the Red and Yellow keys of the remote can be associated with taking an action. The Green key can be associated with "Clear," such that this key removes the notification that is selected or in focus. The Blue key can be associated with "Clear All," such that this key removes all of the notifications from the Notification Canvas. The Green and Blue keys are disabled for system updates and Android notifications, which are designed such that they cannot be deleted.

The Notification Canvas 1101 also has a panel with a number of shortcuts. In an embodiment, the shortcuts include a notifications shortcut 1110, an all apps shortcut 1120, and a home shortcut 1130. These shortcuts allow for seamless transition between the various silos on the Global Notification system. Shortcuts can be customizable to individual user preferences.

In general, notifications are "sticky" in that they should remain on the Notification Canvas after rebooting the display device. The only instances where notifications are removed from the Notification Canvas are as follows. If Toasts are interacted with and the Dialog-Single Function is shown and consumed, the notification is removed. If the Dialog-Single Function is dismissed, though the user manually fulfills the required action (e.g., user dismisses the reminder Dialog but manually navigates to the channel for the set program) the notification is removed. If there is a factory reset, the notifications are removed. If the notification has expired, the notification is removed. In an embodiment, there are persistent notifications on reboot. In an alternate embodiment, there are not persistent notifications on reboot.

Each notification can also be associated with an expiry. All notifications will have a life cycle and eventually be expired by time, event, or connection. Expired notifications will be removed from the canvas. Expiry times can be categorized by length. In an embodiment, there are four different types of expiry times immediate (5 minutes), short (2 hours), medium (1 day), and long (5 days). Notifications can also expire upon occurrence of a specific event. For example, system update notifications can expire after the update is installed or replaced by a new update. New content detected notifications can expire after the user views the new media. New device detected notifications can expire after the user views or scans the device. DVB-C dongle connection notifications can expire after the user has manually navigated to the DVB-C silo. TV reminder notifications can expire after the user manually navigates to the marked program. Live input detection notifications can expire after the user has manually navigated to the input, turned off the live input, or turned off the TV. Recommended movie notifications can expire once a new set of movies is recommended. Recommended TV show notifications can expire once the recommended show is no longer available. Recommended apps notifications can expire once a new set is recommended. Tips to use silo notifications can expire when the suggested feature is used by a user. Showcasing silo feature notifications can expire when the suggested feature is used by a user. Advertisement notifications can expire after a time or some other interaction.

The data model for notifications will include an expiry field. Expiries can be committed by the Global Notification system at boot or on an alarm. Any other event can be used to update alarms or trigger the next alarm. There is also a displaying a notification, which can follow the same pattern as the expiry events. For example, if a message notification is set for a specific holiday, but the date and/or time for the holiday has passed, the notification will expire. This ensures that the display device will not display late or false notifications.

The system can also include a key handling capability. A Key Handler determines which specific key should be designated to interact with the Toast. It is desirable that the specific key chosen is not one commonly used with other applications (that way a Toast will not be unintentionally selected). A process can be implemented to capture all key strokes of a user, and then filtered out which keys are currently active and in use.

When displaying a Toast or Dialog, the system will monitor for a specific key. If a key is pressed and a Key Event is registered, the display device will inform the Global Notification system of the Key Event. If the user presses the specific key, the system will take some action with the Toast, the action taken responsive to the specific key. The user will not be inadvertently disturbed by a Toast, through accidental interaction with a Toast, by hitting any other key. Only the specific key can be used to interact with the Toast. The system will determine, based on the key pressed, what the requisite action (if any) should be.

If the Toast does not receive any input, a user is effectively notifying the system that the user is not interested in the specific events suggested or offered by the Toast. In notifying, the system could track Key Events, such as whenever the user presses a specific button on the user remote control, the system will be notified. The system could then dynamically update Toast characteristics based off a user's activities, habits, and Key Events.

In an embodiment, the notification system can use a specific button (e.g., OK button), to select a Toast when the Toast is presented on the screen. The OK button is directly attributable to taking action related to the Toast. Any other button will be directed to the content behind the Toast. In other words, once a Toast is shown on the screen, the OK button on the user remote control becomes "blocked" such that the button is only connected to taking action on the Toast itself. Once the Toast disappears, the OK button is no longer "blocked." In other words, once the Toast disappears, the OK button can be used for other functionalities associated with the display device, beyond taking action for the specific Toast. This blocking process for the user remote control can be programmed to any specific button on any specific device. This blocking process is likewise implemented with Dialogs.

If the Toast is being shown with simultaneous other user control displays (e.g., volume up display), the Toast will still be displayed, but any action taken with regard to the other user control displays will not affect the action taken by the Toast. In an embodiment, if a user attempts to increase the volume, and a Toast is displayed during this user attempt, the user will be able to complete volume increase process. Taking an action to increase volume will not automatically take an action with regards to the Toast.

To avoid any cross-confusion with keystrokes, the Global Notification system will receive, from the notification, internal information regarding whether a key is specifically set for the Toast. In this Key Handling process, multiple numbers and types of keys can be monitored.

Alternatively, to view a notification, the user can press the Home button, or some other button, on the remote control. This takes the user directly to the Notification Canvas. At this point, the user can view any notification on the Notification Canvas. The user can then switch over to live TV, a different silo, on the display device. Alternatively, notifications can be pushed by the system. At this point, the Dialog-Single Function is selected. The user presses OK on the remote control, acknowledging receipt of the reminder, and is then switched over to live TV on the display device.

Another embodiment, relates to the process of generic message notifications. A generic message notification is pushed by a cloud, a connected external device, or an internal guide (associated with the device) to the Global Notification system. The Global Notification system generates a Toast and displays the Toast on the display device, such that the Toast is associated with the generic message notification. Upon user interaction or a pre-determined time period (such as five seconds) the generic message notification is dismissed.

The number and type of notifications, tips, silos, apps, etc. are potentially limitless. Some common examples to be used by the system can include: a Notification Canvas, Notifications, Mapping Silos/Inputs, Set Reminders, Favorite Channels, JCool App Store, Hisense Companion apps, Content Aggregation, Access to Cloud Storage, Share Content and Edit Name. Some common destinations for interacting with the Dialog can include: triggering the Notification Canvas, opening the Notification Canvas, dismissing the Dialog, triggering the mapping Dialog for the four express keys, triggering the Info Panel within the silo, triggering full screen EPG in live TV, triggering the On Now panel, switching to another application/silo, switching to the Application Center, launching another application/silo, launching the JCool App Store, launching a Hisense Mobile Apps showcase, launching a Hisense Cloud Manager, switching to the Screen Share Center, triggering the Edit Name Dialog, or any combination of the destinations mentioned.

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor, which, when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims While this disclosure has been particularly shown and described with references to exemplary embodiments thereof, it will be understood by those skilled in the art that various changes in form and details may be made therein without departing from the scope of the claimed embodiments.

What is claimed:

1. A method for presenting a notification on a display device, the method comprising:

receiving, by a global notification system of a display device, a notification, the notification received with information regarding whether a user input is specifically set for a toast, wherein the user input is pre-determined by personal settings of a user;

developing, by the display device, a toast for user interaction based on parameters received with the notification, wherein interaction with the toast based on the user input specifically set for the toast provides additional information about a specific notification represented by the toast and a transition to a destination of the display device;

registering, by the display device, a key handling event for the notification prior to presentation of the toast, wherein the key handling event is a user input based on a type of the notification and content presented on the display device and wherein registering the key handling event configures the user input as an input only for the key handling event;

presenting, by the display device, a first graphic for the toast, wherein the first graphic is a graphical element overlay including information related to the notification, and wherein presentation of the first graphic is based on the type of the notification;

detecting, by the display device, at least one of a first action and a key handling event
wherein for first actions associated with no interaction with the notification and dismissive interaction with the notification, the display device sends the notification to a notification canvas,
wherein detecting the key handling event while the first graphic for the toast is presented includes detecting a selective action in response to the notification when the toast is displayed by the display device; and presenting, by the display device, a second graphic based on detection of the key handling event providing the selective action during presentation of the toast.

2. The method of claim 1, wherein by registering the key handling event, the display device blocks the user input such that the user input can only be used to interact with the first graphic for a pre-determined time.

3. The method of claim 2, wherein once the pre-determined time expires, the user input is no longer blocked and can be used for other functionalities associated with the display device.

4. The method of claim 3, wherein the pre-determined time is dictated by the type of the notification.

5. The method of claim 3, wherein the pre-determined time is five seconds.

6. The method of claim 3, wherein the user input is a specific key associated with a remote control for the display device, such that the key handling event is sent to the display device by the remote control.

7. The method of claim 1, wherein the user accesses the notification canvas from the display device to allow the user to view and interact with notifications stored on the Global Notification system of the display device.

8. The method of claim 1, wherein the display device registers the key handling event based on the type of the notification, such that the user input is a responsive command to the notification.

9. The method of claim 1, wherein the display device registers the key handling event based on the content presented on the display device, such that the user input will not interfere with control of the content presented on the display device.

10. The method of claim 1, wherein the display device assigns the notification a priority level, the priority level based on the type of the notification, such that the notification is only presented, by the display device, at a time associated with the priority level.

11. The method of claim 10, wherein the priority level is one of immediate, one-hour delay, one-day delay, one-week delay, or one-month delay.

12. The method of claim 1, wherein the notification has a pre-determined presentation time, such that the notification is presented, by the display device, at a date and a time associated with the pre-determined presentation time.

13. The method of claim 1, wherein the type of the notification is one of alerts, tips, recommendations, advertisements, or messages.

14. The method of claim 1, wherein upon presenting the second graphic, the display device registers a new key handling event, the new key handling event related to the second graphic and functioning as a link to a destination, application, silo, input, or other notification, such that detecting the new key handling event serves to either select the second graphic and follow the link or cancel the second graphic and not follow the link.

15. The method of claim 1, wherein upon presenting the second graphic, the display registers a new key handling event, the new key handling event related to the second graphic and functioning as a user selection to one of a plurality of second options, such that detecting the new key handling event serves to select one of the plurality of second options or cancel the second graphic and not select any of the plurality of second options.

16. The method of claim 1, wherein the display device sends the notification to a tandem device, the tandem device in communication with the display device.

17. A display device comprising:

a display; and a controller coupled to the display, the controller configured to receive a notification by global notification system of the display device, the notification received with information regarding whether a user input is specifically set for a toast, wherein the user input is pre-determined by personal settings of a user;

develop a toast for user interaction based on parameters received with the notification, wherein interaction with the toast based on the user input specifically set for the toast provides additional information about a specific notification represented by the toast and a transition to a destination of the display device;

register a key handling event for the notification prior to presentation of the toast, wherein the key handling event is a user input based on a type of the notification and content presented on the display device and wherein registering the key handling event configures the user input as an input only for the key handling event;

present a first graphic for the toast, wherein the first graphic is a graphical element overlay to include information related to the notification, and wherein presentation of the first graphic is based on the type of the notification;

detect, at least one of a first action and a key handling event wherein for first actions associated with no interaction with the notification and dismissive interaction with the notification, the display device sends the notification to a notification canvas, wherein detecting the key handling event while the first graphic for the toast is presented includes detecting a selective action in response to the notification when the toast is displayed by the display device; and present a second graphic, wherein the second graphic is based on detection of the key handling event providing the selective action during presentation of the toast.

18. The device of claim 17, wherein, by registering the key handling event, the display device blocks the user input such that the user input can only be used to interact with the first graphic for a pre-determined time.

19. The device of claim 18, wherein once the pre-determined time expires, the user input is no longer blocked and can be used for other functionalities associated with the display device.

20. The device of claim 17, wherein the display device is in communication with a tandem device, such that the display device sends the notification to the tandem device.

21. A method for presenting a notification on a display device, the method comprising:

receiving, by a global notification system of a display device, a notification, the notification received with information regarding whether a user input is specifically set for a toast, wherein the user input is predetermined by personal settings of a user;

developing, by the display device, a toast for user interaction based on parameters received with the notification;

registering, by the display device, a key handling event for the notification prior to presentation of the toast, wherein the key handling event is a user input based on a type of the notification and content presented on the display device and wherein registering the key handling event configures the user input as an input only for the key handling event, wherein by registering the key handling event the display device blocks the user input such that the user input can only be used to interact with the first graphic for a pre-determined time;

presenting, by the display device, a first graphic for the toast, wherein the first graphic is a graphical element overlay including information related to the notification, and wherein presentation of the first graphic is based on the type of the notification;

detecting, by the display device, at least one of a first action and a key handling event wherein for first actions associated with no interaction with the notification and dismissive interaction with the notification, the display device sends the notification to a notification canvas, wherein detecting the key handling event while the first graphic for the toast is presented includes detecting a selective action in response to the notification when the toast is displayed by the display device; and presenting, by the display device, a second graphic based on detection of the key handling event providing the selective action during presentation of the toast.

* * * * *